(12) United States Patent
Battisti (10) Patent No.: US 7,978,125 B2
(45) Date of Patent: Jul. 12, 2011

(54) METHOD FOR PROCESSING A RADAR ECHO SIGNAL

(75) Inventor: Nicola Battisti, Rome (IT)

(73) Assignee: MBDA Italia S.p.A., Rome (IT)

(*) Notice: Subject to any disclaimer, the term of this patent is extended or adjusted under 35 U.S.C. 154(b) by 129 days.

(21) Appl. No.: 12/564,788

(22) Filed: Sep. 22, 2009

(65) Prior Publication Data

US 2010/0079331 A1 Apr. 1, 2010

(30) Foreign Application Priority Data

Sep. 26, 2008 (IT) .............................. RM2008A0511

(51) Int. Cl.
*G01S 13/00* (2006.01)
*G01S 13/52* (2006.01)
(52) U.S. Cl. ...................................... 342/160; 342/159
(58) Field of Classification Search ........... 342/159–162
See application file for complete search history.

(56) References Cited

U.S. PATENT DOCUMENTS

| | | | |
|---|---|---|---|
| 4,924,229 A * | 5/1990 | Eichel et al. ................ | 342/25 E |
| 6,747,593 B1 * | 6/2004 | Jaffer ........................... | 342/160 |
| 7,403,153 B2 * | 7/2008 | Kelly et al. .................. | 342/159 |
| 7,675,456 B2 * | 3/2010 | Karam et al. ................. | 342/45 |
| 7,683,827 B2 * | 3/2010 | Kelly et al. .................. | 342/159 |
| 7,796,082 B2 * | 9/2010 | Wood ............................ | 342/205 |

OTHER PUBLICATIONS

Berizzi, F. and Corsini, G. "Focusing of two-dimensional ISAR images by contrast maximization". $22^{nd}$ European Microwave Conference, pp. 951-956, Sep. 5-9, 1992.
Wilkinson, A.J., Lord, R.T. and Ingss, M.R. "Stepped frequency processing by reconstruction of target reflectivity spectrum". IEEE South Africa Symposyum on Communication and Signal Processing Conference, pp. 101-104, Sep. 7-8, 1998.
Search Report and Written Opinion completed on Jul. 31, 2009 for Italian application No. RM2008A000511 filed on Sep. 26, 2008 in the name of MBDA Italia S.p.A (with English translation of Opinion).
Martorella, M., Haywood, B., Berizzi, F., and Dalle Mese, E. "Performance analysis of an ISAR contrast-based autofocusing algorithm using real data". Proceedings of the International Radar Conference, 2003, pp. 30-35, Sep. 3-5, 2003.
Berizzi, F. and Corsini, G. "Autofocusing of inverse synthetic aperture radar images using contrast optimization". IEEE Transactions on Aerospace and Electronic Systems, vol. 32, Issue 3, pp. 1185-1191, Jul. 1996.
S. Simmons and R. Evans, "A new approach to motion estimation for ISAR imaging," Proceedings of the 1994 IEEE International Conference on Acoustics, Speech, and Signal Processing, 1994. ICASSP-94 vol. 2., pp. 201-204, Apr. 19-22, 1994.

* cited by examiner

*Primary Examiner* — Thomas H Tarcza
*Assistant Examiner* — Peter Bythrow
(74) *Attorney, Agent, or Firm* — Steinfl & Bruno LLP (57) ABSTRACT

A method to process a radar echo signal is described. The method determines the value of at least one target motion parameter by selecting from a plurality of possible test values ($VR_1, \ldots, VR_N$) one value (VR) which maximizes a functional defined over the radar echo signal. The method further performs a correction of the radar echo signal based on the value (VR) which is determined by the at least one motion parameter. The functional is the time derivative of the radar echo signal or a function dependent from the derivative.

10 Claims, 9 Drawing Sheets

METHOD FOR PROCESSING A RADAR ECHO SIGNAL

CROSS REFERENCE TO RELATED APPLICATIONS

The present disclosure claims priority to Italian Patent Application No. RM2008A000511 filed on Sep. 26, 2008, which is incorporated herein by reference in its entirety.

FIELD

The present disclosure concerns radar detection systems and in particular it refers to a method for processing a radar echo signal, which is generated by a target, to compensate degradation effects on said signal due to target motion.

BACKGROUND

It is known that in radar systems the relative motion between the radar detector and the target is such to introduce degradation effects on the received radar echo signal (or "range profile"). As a matter of fact, it is known that such relative motion introduces blurring—a reduction of the peak level and an increase of the size of the side lobes in the range profile. In particular, this is due to the fact that the relative motion between the radar device and the target introduces both a Doppler displacement and a residual phase modulation into the range profile.

The degradation effects described above have a negative impact—particularly but not exclusively—on the performance or high resolution radar systems, or HRR (High Range Resolution) radar systems, and more in particular the performance of the so-called synthetic band radar systems. In this particular type of systems, obtaining a well focused range profile and maintaining the desirable resolution of the range profile is of vital importance.

Compensation of the abovementioned degradation effects of the range profile by means of processing techniques based on maximizing the contrast measure is known in the prior art. An example of the abovementioned method is for example described in "Focusing of two-dimensional ISAR images by contrast maximization", by F. Berizzi and G. Corsini, IEEE Transaction on Aerospace and Electronic Systems, 3 Jul. 1996, incorporated herein by reference in its entirety.

SUMMARY

According to embodiments of the present disclosure, a processing method for the compensation of degradation effects due to target motion is provided as defined in the attached claim 1. Further embodiments are provided in the dependent claims.

According to another embodiment of the present disclosure, a radar detector as defined in the attached claim 9 is provided.

BRIEF DESCRIPTION OF THE DRAWINGS

Further features of the present disclosure shall be clearer from the following description and drawings, wherein.

DESCRIPTION OF EXAMPLE EMBODIMENTS

Elements or parts of elements in common among the embodiments described hereinafter shall be indicated using the same reference numbers.

Referring to the abovementioned figures, a method for processing a radar echo signal, hereinafter referred to as "range profile", for compensating degradation effects introduced into said signal by target motion is indicated in its entirety with 100. For the sake of brevity, the abovementioned processing method 100 shall also be indicated in the present description as a compensation method 100 or focusing method 100.

It should be observed that according to the present description the term "target motion" shall be generally used to indicate a relative motion between the radar device and a target impacted by a radar echo signal transmitted by the radar device. Such movement may thus be due to the motion of moveable target with respect to a fixed radar device, due to the motion of a moveable radar device with respect to a fixed target, as well as due to the relative motion between a radar device and a target, both being moveable.

According to an embodiment of the present disclosure, the compensation method 100 comprises a step 101 for reconstructing a range profile to be compensated starting from a plurality of radar echo signals received from the radar device, in response to a plurality of signals transmitted by the radar device to the target according to the so-called "frequency stepping" technique.

It is known that through this type of technique it is possible to obtain a high resolution range profile, or HRR (High Range Resolution) range profile, transmitting—through the radar device—a sequence of pulses at different carrier frequencies and suitably processing the received radar echo signals to combine them together in order to obtain a wide synthetic band.

This technique provides high resolution range profiles requiring a relatively low instantaneous band and thus a relatively low sampling frequency. The high resolution range profile reconstruction technique according to the frequency stepping method has already been long considered as part of the technical knowledge of a man skilled in the art and thus it shall not be dealt with further in detail in the present description. Such technique is for example described in "Stepped frequency processing by reconstruction of target reflectivity spectrum", by R. T. Lord and M. R. Ingss, Proceedings of the IEEE South Africa Symposyum on Communication and Signal Processing Conference, 9-10 Sep. 1997, incorporated herein by reference in its entirety.

A few issues will be initially addressed with reference to the model used for radar signals transmitted by a radar detector and the signals reflected by a target and received by the radar detector.

The signal transmitted, in the complex envelope form, by a radar detector towards a target in case of transmission according to the frequency stepping method is a sequence of N pulses spaced in frequency and it can be written in the form:

$$s_T(t)_i = p(t) \cdot e^{j2\pi f_i t} \quad i=1,2,\ldots,N \tag{1}$$

wherein:

$$p(t) = A \cdot e^{j\pi kt^2} rect\left(\frac{t}{T}\right) \tag{2}$$

and:

$$kT = B \tag{3}$$

wherein T represents the time duration of the pulse and B represents the instantaneous bandwidth of the pulse.

Regarding the description of the problem related to the compensation of the degradation effects introduced by target motion in the received radar echo signal, analyzing the radar echo signal returned from a single pulse is deemed sufficient herein and—for the sake of description simplicity—index i shall be omitted from the expression of the pulse.

The radar echo signal reflected by a target and received at the radar detector may be expressed as $$s_R(t) = s_T(t) \otimes \zeta(t) \tag{4}$$

wherein $\zeta(t)$ is the reflectivity function of the target which expresses the scattering properties of the target at a distance R mapped in the time domain $t=2R/c$.

If the target is comparable to a single reflector at distance R from the radar detector it is observed that:

$$\varsigma(t) = \sigma \cdot \delta\left(t - 2\frac{R}{c}\right) \tag{5}$$

hence:

$$s_R(t) = s_T(t) \otimes \zeta(t) = s(t)_T \otimes \left\{\sigma \cdot \delta\left(t - 2\frac{R}{c}\right)\right\} = \sigma \cdot s\left(t - 2\frac{R}{c}\right)_T \tag{6}$$

Thus it can be observed that the received signal $s_R(t)$ is a delayed copy of the transmitted signal and its amplitude depends on the scattering characteristics of the target through the complex coefficient $\sigma$.

In the so-called high resolution techniques, or HRR techniques, the target can be characterised as a plurality of scattering points, hence the discrete model of the received radar echo signal in case of NR scattering points is:

$$\varsigma(t) = \sum_{i=1}^{NR} \sigma_i \cdot \delta\left(t - 2\frac{R_i}{c}\right). \tag{7}$$

For the sake of simplicity, motion compensation in case of a single reflector shall be addressed further hereinafter.

The radar device/target kinematic law may be expressed, when the duration of the received pulse is relatively brief, by means of a second order polynomial:

$$R(t) = R0 + VR \cdot t + \frac{1}{2} \cdot AR \cdot t^2 \tag{8}$$

wherein R0 is the initial distance between target and radar device, VR is the target radial velocity with respect to the radar device and AR is the radial acceleration of the target with respect to the radar device. The delay associated to the radar echo signal received by the radar detector may be expressed as:

$$\frac{c}{2}\tau(t) = R(t) \Rightarrow \tau(t) = \frac{2}{c}R(t) = \frac{2}{c}R0 + \frac{2}{c}VR \cdot t + \frac{1}{c}AR \cdot t^2. \tag{9}$$

In compact notation, the transmitted signal may be expressed as:

$$s_T(t) = e^{j\varphi(t)} \cdot e^{j\psi(t)} \cdot w(t) \tag{10}$$

$$\varphi(t) = 2\pi f_0 t$$

$$\psi(t) = \pi k t^2$$

$$w(t) = rect\left(\frac{t}{T}\right)$$

Hence the radar echo signal returned from the target may be expressed as:

$$s_R(t) = s(t-\tau(t))_T = \sigma \cdot e^{j\phi(t-\tau(t))} \cdot e^{j\psi(t-\tau(t))} \cdot w(t-\tau(t)), \tag{11}$$

After a few mathematical steps, ignoring the t terms of the third and fourth order in the function $\psi(t-\tau(t))$, it is observed that:

$$\psi(t-\tau(t)) \cong \pi k(t-\tau_0)^2 + \pi k\left(\left(\frac{4}{c^2}R0 \cdot AR - \frac{4}{c}VR\right) \cdot t^2 + \frac{8}{c^2}R0 \cdot VR \cdot t\right) \tag{12}$$

$$\varphi(t-\tau(t)) = 2\pi f_0(t-\tau_0) - \frac{4}{c} \cdot \pi f_0 VRt - \frac{2}{c} \cdot \pi f_0 ARt^2$$

$$\tau_0 = \frac{2}{c}R0$$

Defining the time function $\alpha(t,R0,VR,AR)$: depending on the unknown motion parameters R0, VR, AR as:

$$\alpha(t, R0, VR, AR) = -\frac{4}{c} \cdot \pi f_0 VRt - \frac{2}{c} \cdot \pi f_0 ARt^2 + \pi k\left(\left(\frac{4}{c^2}R0 \cdot AR - \frac{4}{c}VR\right) \cdot t^2 + \frac{8}{c^2}R0 \cdot VR \cdot t\right) \tag{13}$$

The received signal may be expressed as:

$$s(t)_R \cong A \cdot e^{j\phi(t-\tau_0)} \cdot e^{j\psi(t-\tau_0)} \cdot e^{j\alpha(t,R0,VR,AR)} \cdot w(t-\tau_0) = A \cdot p(t-\tau_0) \cdot e^{j\alpha(t,R0,VR,AR)} \tag{14}$$

Hence, using the definition of the target reflectivity function $\zeta(t)$ it is observed that:

$$s(t)_R \cong [p(t) \otimes \zeta(t)] \cdot e^{j\alpha(t,R0,VR,AR)} \tag{15}$$

$$\zeta(t) = A \cdot \delta\left(t - \frac{2R0}{c}\right)$$

$$\tau_0 = \frac{2R0}{c}$$

The previous expression shows that the motion with respect to the radar device of a target comparable to a single reflector introduces both a Doppler shift, linear with respect to time, and a phase modulation quadratic with respect to time. The degradation effects introduced by target motion are represented by the term $e^{j\alpha(t,R0,VR,AR)}$, or degradation factor, which depends—through the function $\alpha(t,R0,VR,AR)$, or coefficient of degradation—on the unknown motion parameters R0, VR, AR of the target.

A compensation method shall thus have to cancel the degradation factor from the radar echo signal, or range profile, received. However, in order to cancel such effect, an estimation of the coefficient of degradation $\alpha(t,R0,VR,AR)$ and thus the value of the unknown target motion parameters R0, VR, AR, is required.

For the sake of simplicity, the compensation method 100—to be described hereinafter—shall particularly refer, and without introducing any limitations whatsoever, to the compensation of the received range profile carried out according to only one target motion parameter, and in particular according to the radial velocity VR. It should however be borne in mind that the teachings of the present disclosure may be easily extended by a man skilled in the art to compensation methods that consider several or all target motion parameters even though it has been observed that the radial acceleration AR of the target typically introduces into the function $\alpha(t,R0,VR,AR)$ a contribution which could be ignored in most practical applications. Thus, in such cases, compensation of the effects introduced by the radial acceleration AR of the target may be superfluous.

Furthermore, it should be observed that in a high resolution range profile, or HRR range profile, each scattering point of the target has its own set of parameters R0, VR, AR, but—in practice—motion compensation based on the movement of the target barycentre may be sufficient, given that the VR and AR variations in the target are negligible.

From now henceforth, reference shall be made, without introducing any limitations whatsoever, to the case wherein the method 100 is conceived to compensate the degradation effects introduced in the range profile by only one target motion parameter, such as for example the radial velocity VR.

Figure 1:
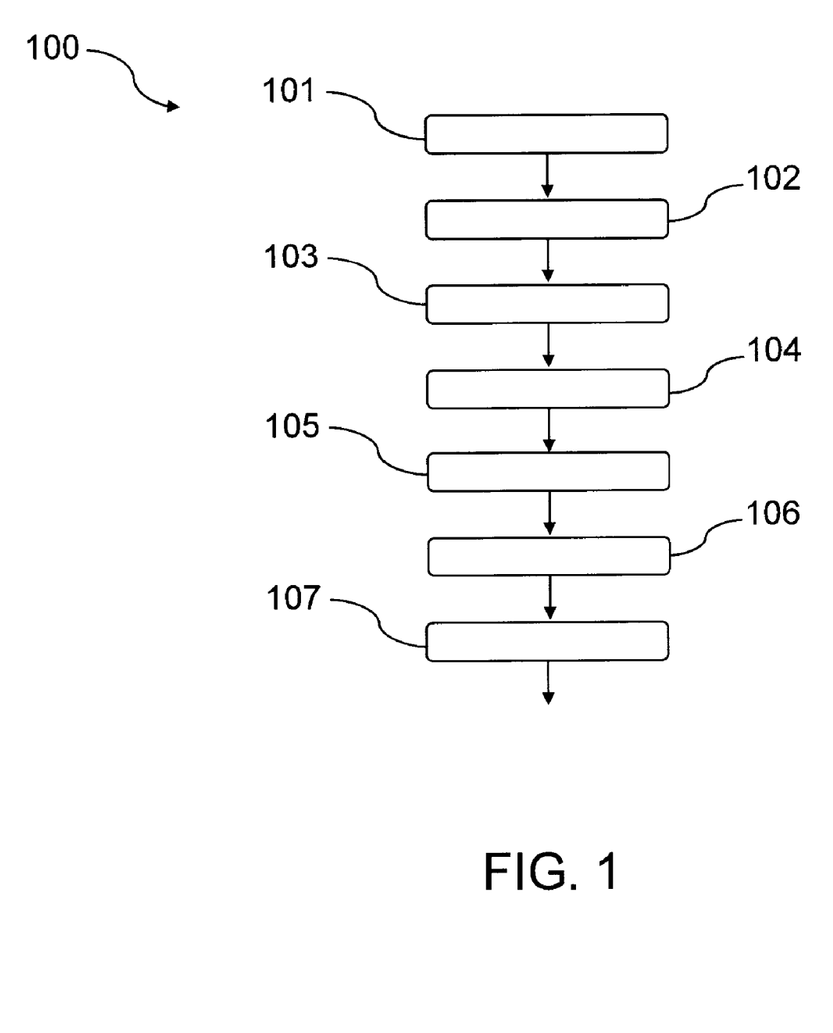
FIG. 1 represents a simplified flow chart of a compensation method, or focusing method.

Referring to FIG. 1, the method 100 comprises the steps of:
  determining 102-106 the value of at least one target motion parameter selecting, from among a plurality of possible test values, a value maximizing a functional defined over the received radar echo signal;
  performing a correction 107 of said radar echo signal based on the value which is determined by at least one motion parameter.

In particular, the functional used in the compensation method 100 in the abovementioned determining step 102-106 is the time derivative of said radar echo signal or a function dependent from said derivative.

Before getting deeper into the description of the compensation method 100, it is deemed suitable to point out that the particular choice of the abovementioned functional is due to the fact that the Applicant observed that a well compensated, i.e. well focused, radar echo signal or range profile has a derivative with greater amplitude, in terms of module, with respect to the derivative of the same radar echo signal when the latter is compensated in a non-ideal manner. In other words, the Applicant observed that the time derivative of the range profile contains information about the focusing degree of the range profile.

Figure 4:
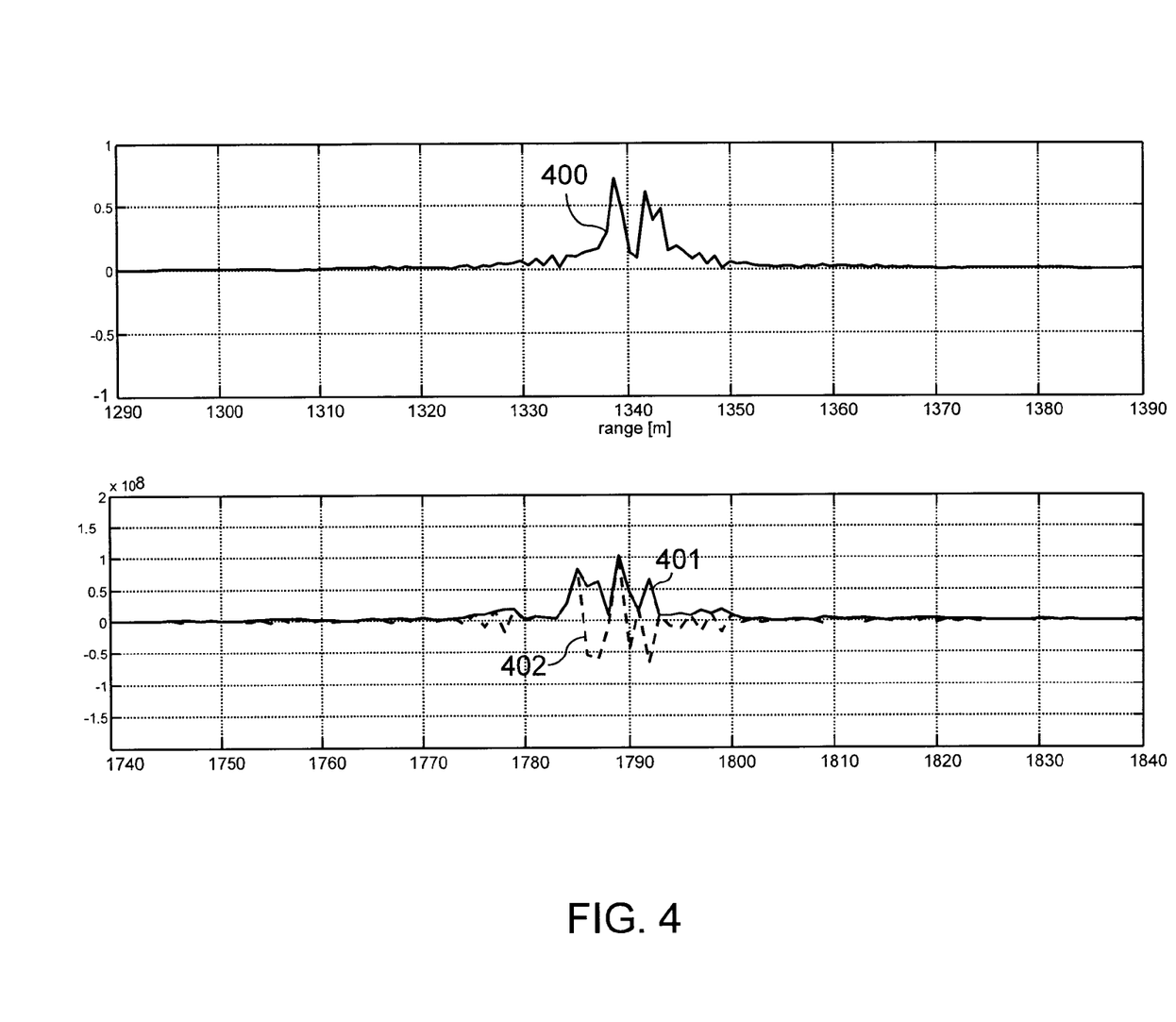
FIG. 4 represents some graphs regarding a compensated range profile having a relatively low focusing degree.

FIG. 4 shows a compensated range profile 400 (according to one VR alone) with a radial velocity value different from the actual radial velocity VR of the target. The axis of the abscissa represents the axis of the times normalised in distance. In the example, the range profile 400 regards a target having two scattering points, each arranged at a distance of 1.5 m from the target barycentre, an actual radial velocity VR of 500 m/s, an actual radial acceleration AR of 9.8 m/s$^2$ and an initial radial distance R0 from the radar device equivalent to 1276.5 m. The compensation was carried out assuming that the target radial velocity is equivalent to 481 m/s. In FIG. 4 reference 402 was used to indicate the graph of the time derivative of the range profile 400 and reference 401 was used to indicate the graph of the module of the time derivative 402.

Figure 5:
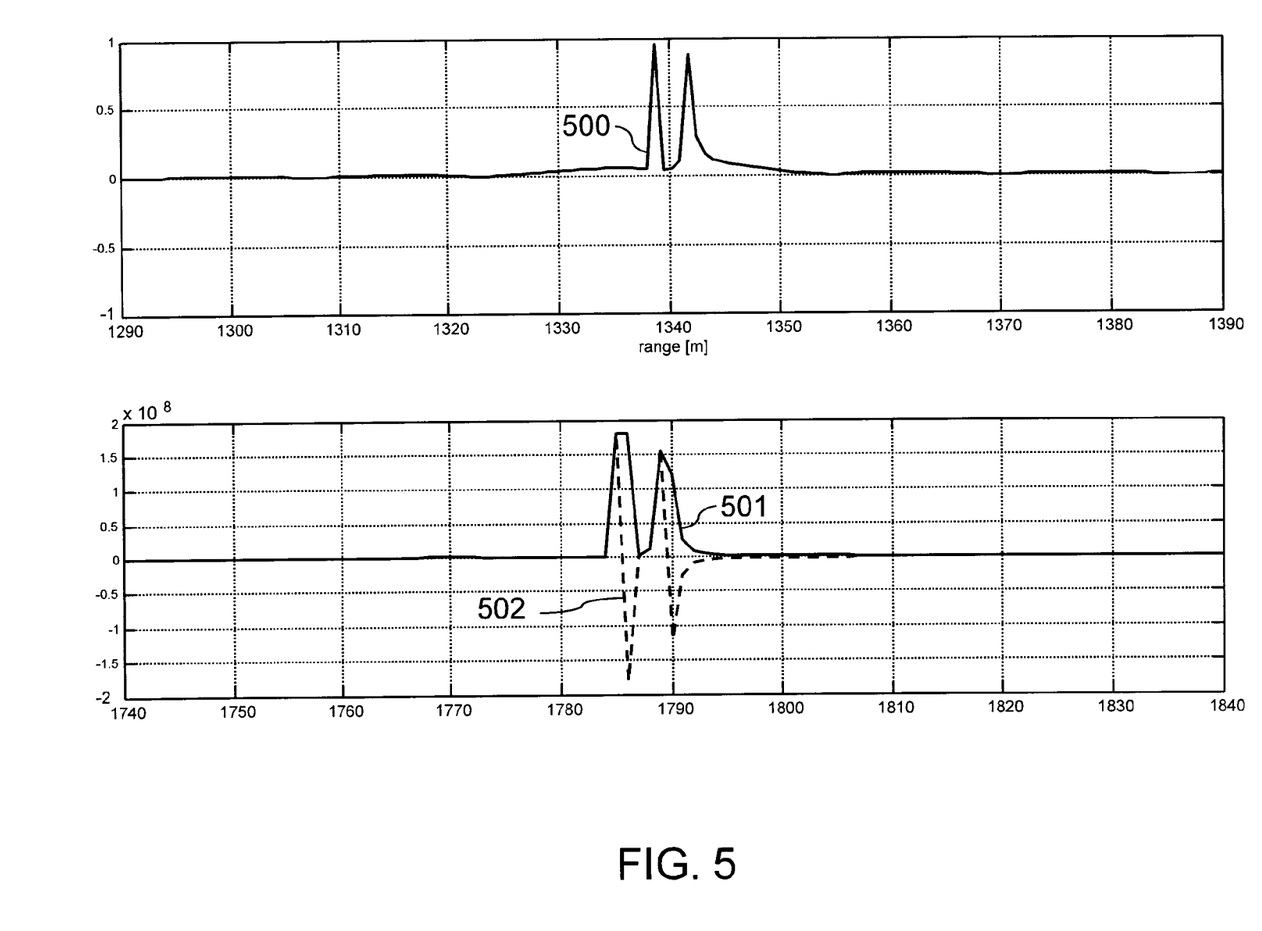
FIG. 5 represents some graphs regarding a compensated range profile having a greater focusing degree with respect to the range profile of FIG. 4.

FIG. 5 instead shows a compensated range profile 500 (according to the VR alone) with a radial velocity value equivalent to the actual radial velocity VR of the target. In the example, the range profile 500 regards a target having two scattering points, an actual radial velocity VR of 500 m/s, an actual radial acceleration AR of 9.8 m/s$^2$ and an initial radial distance R0 from the radar device equivalent to 1276.5 m. Compensation was carried out by setting—in the compensation algorithm—a radial velocity VR of the target equivalent to 500 m/s. In FIG. 5, reference 502 was used to indicate a graph of the time derivative of the range profile 500 and reference 501 was used to indicate the graph of the module of the time derivative 502.

By comparing FIGS. 4 and 5 it can be observed how the maximum amplitude, in terms of module, of the time derivative of the well compensated, i.e. well focused, range profile is considerably greater with respect to the maximum amplitude, in terms of module, of the time derivative of the poorly compensated range profile.

By comparing FIGS. 4 and 5 it can also be observed that the two peaks corresponding to the two reflectors are clearly distinguishable in the case of the range profile of FIG. 5.

Referring to FIG. 1, according to a further embodiment of the present disclosure, the abovementioned phase 102-106 of determining the value of at least one motion parameter (in this example, without introducing any limitation, the value of the radial velocity VR) comprises the steps of:
  correcting (102) the radar echo signal based on each of the test values $VR_1, \ldots, VR_N$ belonging to said plurality of test values $VR_1, \ldots, VR_N$ to obtain a plurality of corresponding correct signals, each being associated to a respective test value $VR_1, \ldots, VR_N$;
  computing (103) the time derivative, or a function of said derivative, of each of said corrected signals;
  computing (104) for each of said derivatives, or each of said functions of the derivative, the respective maximum module thus obtaining a plurality of maximum modules, each of these being associated to a respective test value $VR_1, \ldots, VR_N$ of said at least one motion parameter;
  selecting (106) from among said test values $VR_1, \ldots, VR_N$ the test value to which the module of said plurality of maximum modules having maximum value is associated.

Figure 6:
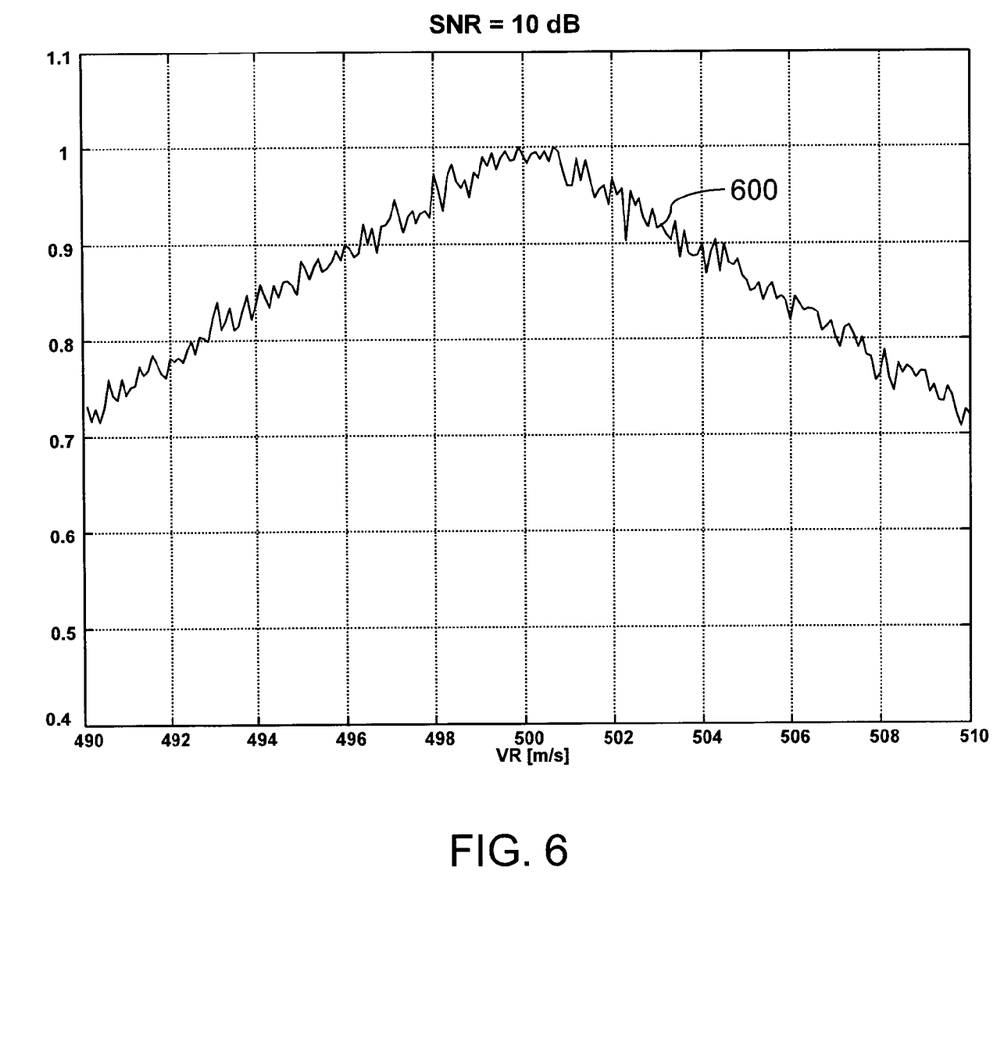
FIG. 6 represents a graph outlining the development of the maximum module of the derivatives of a compensated radar echo signal in function of different test values selected for the target radial velocity that produced the radar echo signal, under conditions of relatively high signal/noise ratio.

FIG. 6 shows a graph 600, in function of the different test radial velocities $VR_1, \ldots, VR_N$ for which the correction step 102, of the different maximum modules of the derivatives obtained following steps 102, 103, 104, was carried out applying the compensation method to a range profile regarding a single scattering point on the target, wherein the test parameter representing the target motion is the radial velocity VR. The example refers to the case wherein the actual target radial velocity is equivalent to 500 m/s and wherein the noise/signal ratio of the received range profile is relatively high, in the example equivalent to 10 dB. In the selection step 106 the test value VR at which the curve of FIG. 6 has its maximum value is selected from among a plurality of the different test values $VR_1, \ldots, VR_N$. Such value is used for the final correction on the range profile reconstructed in the step 101 performed in the step 107 of the method 100, aimed at cancelling the effects of the degradation factor subject to the formula (10).

Figure 7:
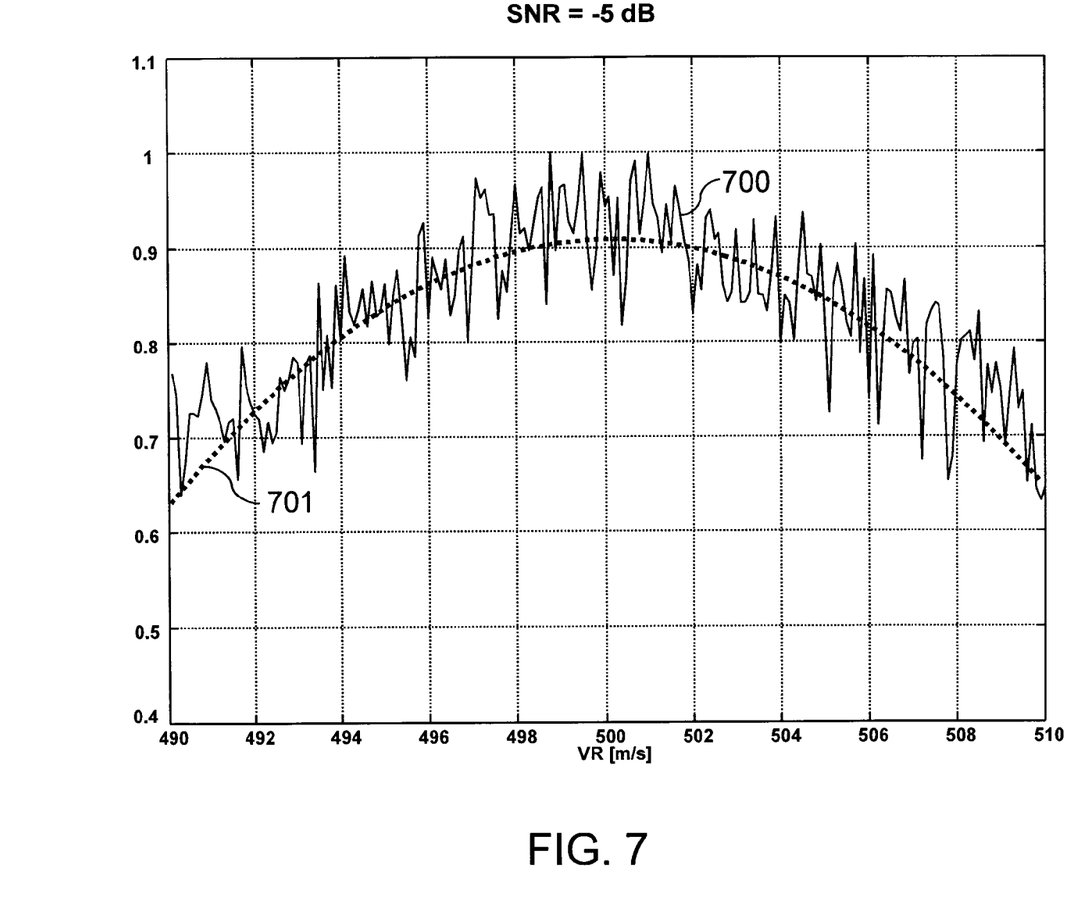
FIG. 7 represents a graph outlining the development of the maximum module of the derivatives of a compensated radar echo signal in function of different test values selected for the target radial velocity that produced the radar echo signal, under conditions of relatively low signal/noise ration.

Represented in the graph of FIG. 7 is a curve 700 analogous to the graph of FIG. 6, obtained under the same conditions and using the same method of the graph of FIG. 6 except for the fact that in this case a relatively low signal/noise ratio, equivalent to −5 db in the example, was assumed.

As it may be observed, while the determination of the maximum of the graph 600 of FIG. 6 is an estimation that may be carried out with a relatively low variance, under conditions of relatively low signal/noise ratio, the determination of the maximum of the curve 700 is an estimation characterized by a high variance.

Referring to FIG. 1, according to a further embodiment of the present disclosure, the focusing method 100 can comprise a further step 105, carried out after steps 103-104 (calculation of the range profiles derivatives corrected in function of the different test values $VR_1, \ldots, VR_N$ of the motion parameter and the obtainment of the maximum modules of said derivatives) and before the step 106 (selection of the test value which maximizes the maximum module), of interpolating (or "fitting") the plurality of maximum modules, obtaining a plurality of interpolated maximum modules each of these being associated to a respective test value $VR_1, \ldots, VR_N$ of said motion parameter. In this case, the selection step 106 is carried out in such a manner to select—from among the possible test values $VR_1, \ldots, VR_N$—the test value to which the module of said plurality of interpolated maximum modules having maximum value is associated. In FIG. 7 the dotted line 701 is used to indicate a curve that interpolates the values of the curve 700. In practice, in this embodiment, in step 106 the test value VR at which the curve of the interpolated maximum modules 701 has its maximum is selected.

By observing FIG. 7 it is clear that the interpolated curve 701 of the maximum modules has a maximum value easier to locate with respect to the maximum of curve 700 and which is closer to the actual value of the actual radial velocity of target (in the example equivalent to 500 m/s).

According to an embodiment of the disclosure, the interpolation carried out in step 105 can be carried out by means of a polynomial, according to the minimum squares method. For example, the interpolating polynomial can be a second order polynomial. However, in the case of range profiles having a more complex development it is possible to use polynomials having a degree greater than the second order.

To test the performance of the compensation method 100 of the type described above, the Applicant carried out Monte-Carlo simulations so as to evaluate the standard deviation on the estimation of the radial velocity VR in the case of a single reflector or a double reflector, upon variation of the signal/noise ratio of the received range profile on the radar detector. The obtained results were compared with the results obtained under the same conditions by a first and a second compensation method wherein the functionals to be maximised for focusing the range profile are respectively a first and a second contrast measure, different from each other.

Figure 8:
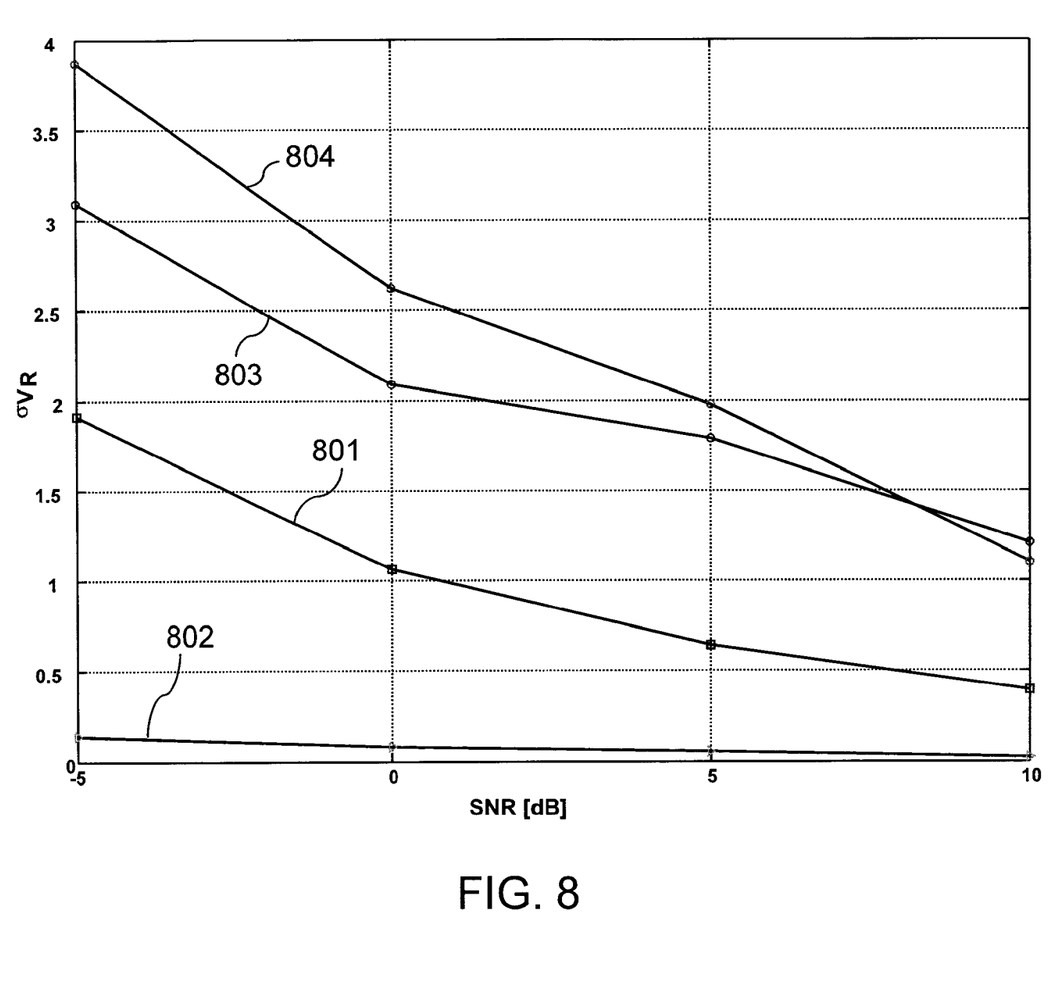
FIGS. 8 and 9 show graphs regarding experimental results wherein performances of a method according to the present disclosure are compared with respect to compensation methods based on the contrast maximization method.
Figure 9:
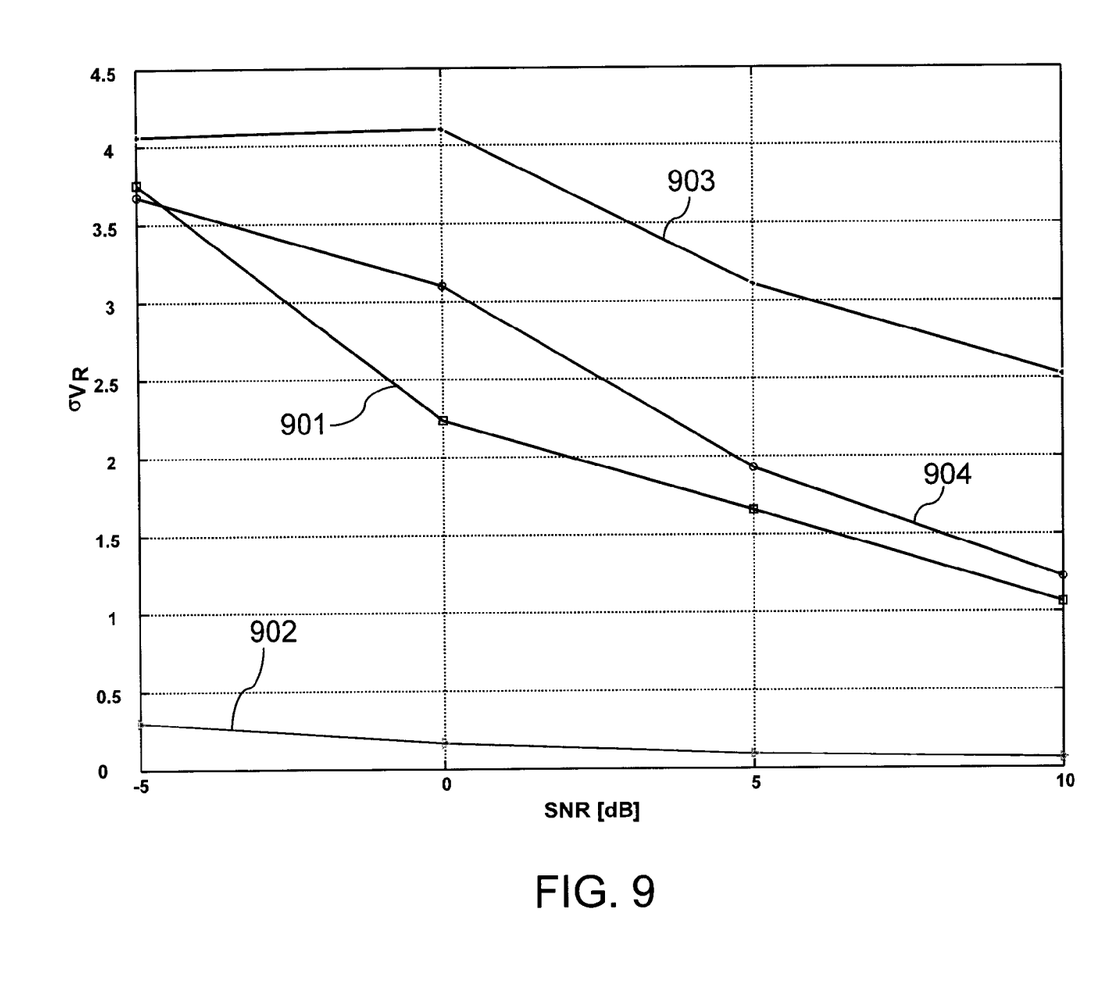

The graphs regarding the simulations in the case of the single reflector and double reflector are respectively indicated in FIGS. 8 and 9, outlined in which is the standard deviation (ordinate axis) in the estimation of the unknown motion parameter (radial velocity Vr) upon variation of the signal/noise ratio (abscissa axis) on the single pulse for:

a compensation method 100 of the type described above, wherein the step 106 of interpolating maximum modules (curve 801, curve 901) is not carried out;

a compensation method of the type described above 100, wherein the step 106 of interpolating maximum modules (curve 802, curve 902) is carried out;

a compensation method of the prior art based on the maximisation of a first contrast measure (curve 803, curve 904);

a compensation method of the prior art based on the maximisation of a second contrast measure (curve 804, curve 903).

As observable from the experiment results of the graphs in FIGS. 8 and 9, a compensation method 100 of the type described above allows fully attaining the preset objects.

Figure 2:
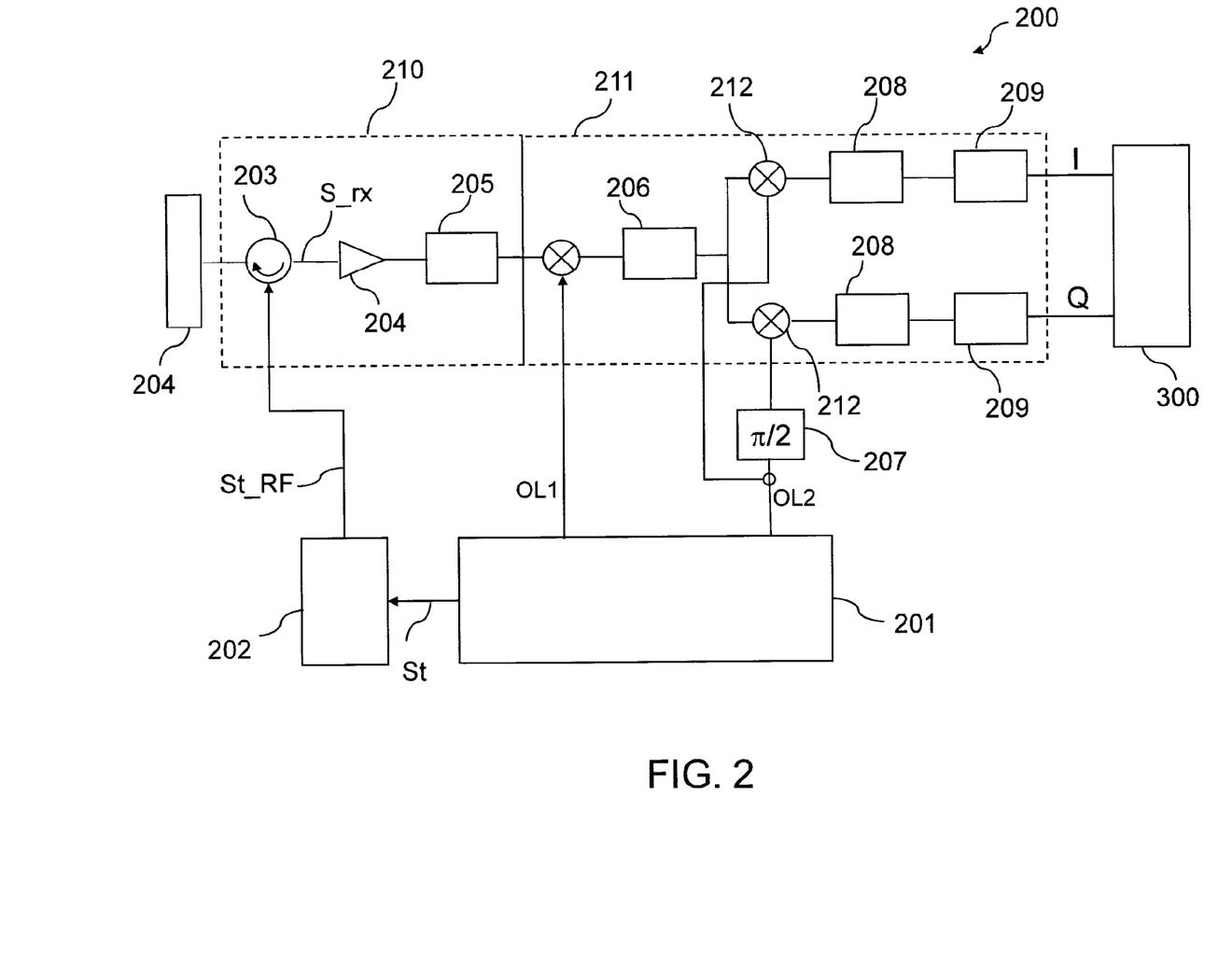
FIG. 2 represents a functional block diagram of a radar device comprising a module for processing the signal for compensating degradation effects due to target motion.
Figure 3:
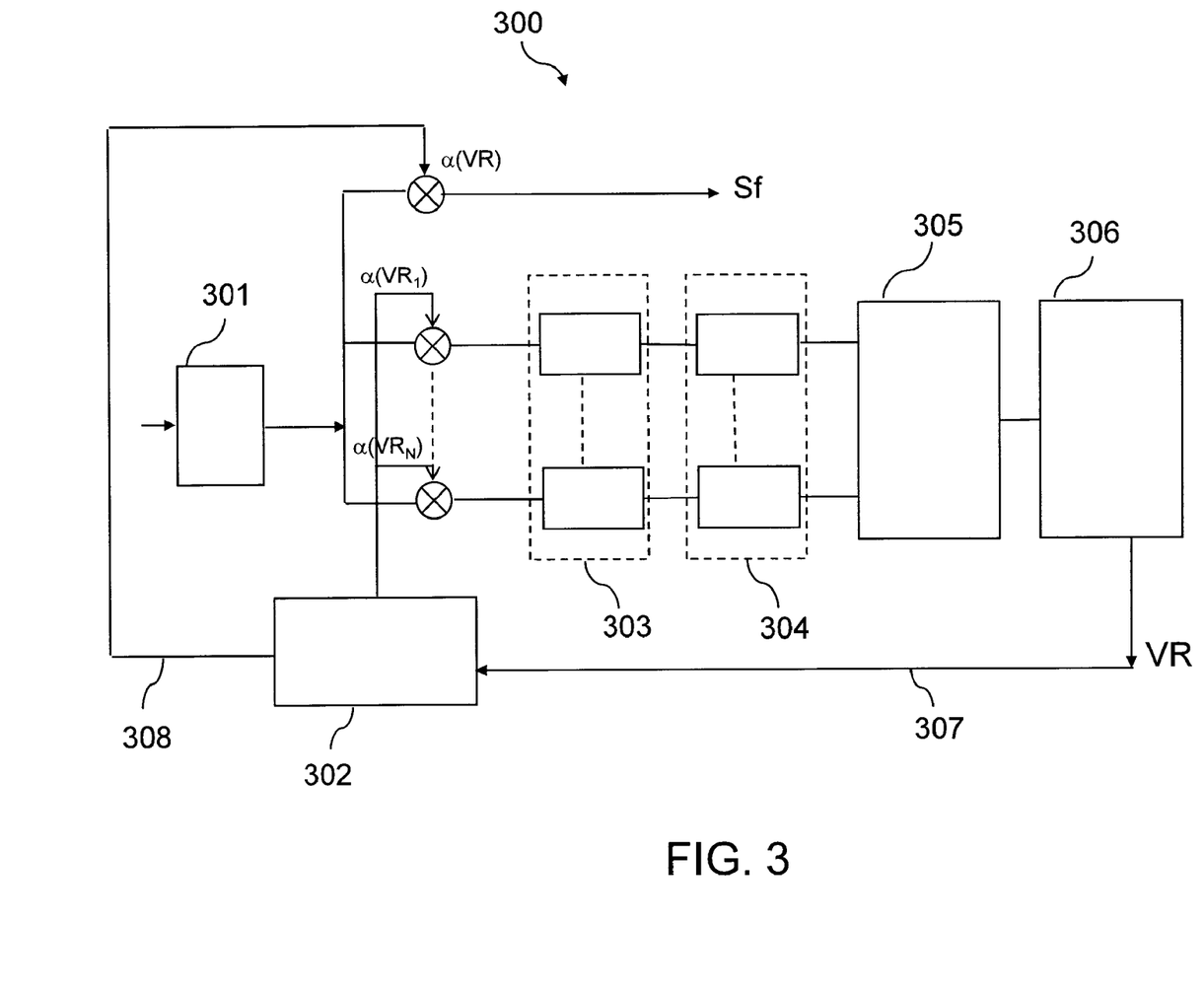
FIG. 3 represents a further detail of a part of the functional diagram of the module for processing the signal of FIG. 1.

Referring to FIGS. 2 and 3, an embodiment of a radar detector 200, or—in brief—radar device 200 will be described. Radar device 200 is adapted to implement a compensation method 100 of the type described above. Such device may be used in civil or military applications without distinction.

Referring to FIG. 2, the radar device 200 includes a signal synthesizer 201 adapted to provide—in output—the radar signal to be transmitted St, and adapted to provide—in output—two local oscillator signals OL1, OL2 respectively for the conversion of the received radar echo signal S_rx into intermediate frequency and for the coherent conversion of the radar echo signal converted into intermediate frequency into baseband, with the extraction of the in-phase component I and the in-quadrature component Q, i.e. for coherent demodulation.

The radar device 200 further comprises a radio frequency transmission module 202 adapted to receive—in input—the signal St coming from the signal synthesizer 201 to provide—in output—a radio frequency signal S_tx to be transmitted towards a target. The radar device 200 further comprises a circulator 203 and an antenna 204 adapted to receive—in input—the radio frequency signal S_tx for irradiating such signal into the free space.

The upper branch of FIG. 2 schematically represents the receiving chain of the radar echo signals reflected by a target and received by the radar device 200 through the antenna 204.

In the upper branch, through the circulator 203, the antenna 203 is connected to an amplifier 204 (e.g., a low noise amplifier), and a first band-pass filter 205. In FIG. 2 the part of the diagram enclosed in the square 210 represents the radio frequency portion of the receiving chain.

The radar echo signal output from the radio frequency portion 210 is converted into an intermediate frequency signal, by means of the clock signal of the local oscillator OL1. Further provided for in the radar device 200 is a second band-pass filter 206 adapted to receive—in input—the radar echo signal converted into intermediate frequency and a demodulator 212 for coherent demodulation of such signal, i.e. to extract from the signal output from the band-pass filter 206 the in-phase component I and the in-quadrature component Q, respectively using the local oscillator OL2 provided in output from the signal synthesizer 201 and a shifted version of the signal OL2 shifted by means of a phase shifter 207.

The blocks 208 represent two band-pass filters, one for filtering the in-phase component I and the other for filtering the in-quadrature component Q. Also provided for in the device 200 are two analogue/digital converters 209 for the sampling and quantisation of the signals output from the band-pass filters 208.

With continued reference to FIG. 2, the radar device 200 also comprises a signal digital processor 300 adapted to receive the digital samples output from the analogue/digital converters 209, which represent the received radar echo signal, borne in the baseband and digitized. The signal digital processor 300 is in practice obtained by means of a suitable combination of hardware and software components. For example, it can be obtained by means of a DSP, an FPGA or by means of other signal digital processing hardware/software means.

The signal digital processor 300 is such to process the digitized radar echo signal in order to extract information useful for locating and/or identifying the target.

The functional diagram of the portion of the signal digital processor 300 conceived to implement the compensation method 100 described previously with reference to FIG. 1 is represented in FIG. 3. In such figure, the processing module 301 is an optional module which represents the module intended to reconstruct the synthetic band and it is such to carry out the processing step 101, optional, already described with reference to FIG. 1.

The signal digital processor 300 further comprises a correction module 302, adapted to cancel from the received radar echo signal the effects of the degradation factor, depending on the coefficient of degradation α, subject to the formula (15). In the example it is assumed—for the sake of simplicity—that such correction is carried out only making reference to the radial velocity VR. For this reason, the digitized radar echo signal is corrected (this corresponds to step 102 of the method 100, already described with reference to FIG. 1) with a plurality of test values $VR_1, \ldots, VR_N$ to obtain a plurality of corrected radar echo signals, received from a module 303 for determining the time derivative of each of such corrected radar echo signals.

In the processor 300, the processing module 304 is conceived to identify the maximum module of each of such derivatives. For example, an interpolating module 305 can be further provided, for interpolating (corresponding to step 105 of the method 100, already described with reference to FIG. 1) the maximum modules produced in output from the processing module 304.

Also a processing module 306 can be further provided, suitable to select from among different test values $VR_1, \ldots, VR_N$ of the radial velocity the value to which it corresponds, i.e. to which it is associated, the maximum of the maximum modules in output from the processing module 304 (non-interpolated maximum modules) or the maximum of the maximum modules in output from the interpolating module 305 (interpolated maximum modules).

Lastly, the VR value selected by the processing module 306 is sent to the correction module 302, for the final compensation of the radar echo signal, as shown by the path 307, 302, 308 in order to provide—in output—a focused Sf radar echo signal, or range profile.

The present disclosure also provides a computer product comprising software code portions, which may be directly loaded into a memory of a computer, adapted to perform the method or methods according to the teachings of the present disclosure.

Though some specific examples have been described, a man skilled in the art, with the aim of meeting contingent and specific requirements, may perform various modifications and variants on the method and radar device described above, all falling within the scope of the invention as defined by the following claims.

For example, it shall be clear that, in case the compensation method 100 is carried out according to two target motion parameters, for example according to the radial velocity VR and according to the radial acceleration AR, the test values used for the correction subject to step 102 represent pairs $(AR_j, VR_k)$ of such parameters, with $j=1, \ldots, N$ and $k=1, \ldots, M$, wherein N and M are two integers.

The above considerations may also apply to the case wherein the motion parameters to be considered in the compensation method are more than two.

The examples set forth above are provided to give those of ordinary skill in the art a complete disclosure and description of how to make and use the embodiments of the method for processing a radar echo signal of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) in the Background, Summary, and Description of Example Embodiments is hereby incorporated herein by reference.

It is to be understood that the disclosures are not limited to particular equipment, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Although any methods and materials similar or equivalent to those described herein can be used in the practice for testing of the specific examples of appropriate materials and methods are described herein.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method to process a radar echo signal provided by a target to compensate for degradation effects introduced in said signal by target motion, the method using a computer processor to perform the steps of:
   determining a value of at least one target motion parameter, by selecting among a plurality of possible test values a maximizing value that maximizes a functional defined over the radar echo signal, said functional being the time derivative of the radar echo signal, or a function of said derivative; and
   performing a correction of the radar echo signal, based on said maximizing value.

2. The method according to claim 1, wherein the step of determining the value of the at least one target motion parameter comprises the steps of:
   a) correcting the radar echo signal based on each test value of said plurality of possible test values in order to obtain a plurality of corresponding corrected signals, each associated to a respective test value;

b) computing the time derivative, or a function of said derivative, of each of said corrected signals;

c) computing, for each of said derivatives, or said functions of the derivative, a respective maximum module, in order to provide a plurality of maximum modules, each associated to a respective test value of the at least one motion parameter; and d) selecting among said test values, the test value to which the module having a maximum value among said plurality of maximum modules is associated.

3. The method according to claim 2, further comprising, between the computing step c) and selecting step d), an interpolating step e) of said plurality of maximum modules, providing a plurality of maximum interpolated modules, each associated to a respective test value of said motion parameter, and wherein said selecting step d) is such as to select, among said test values, the test value to which the module having a maximum value, among said plurality of interpolated maximum modules, is associated.

4. The method according to claim 3, wherein the interpolating step e) is performed by means of a polynomial, according to the least squares criterion.

5. The method according to claim 4, wherein the polynomial is a second order polynomial.

6. The method according to claim 1, wherein the at least one target motion parameter is the radial velocity.

7. The method according to claim 1, wherein the radar echo signal is a synthetic band signal, provided by means of a frequency stepping technique.

8. The method according to claim 1, wherein the radar echo signal is one among a plurality of radar echo signals, provided by the target, each corresponding to a respective scattering point on the target, and wherein said radar echo signal, processed by said method, corresponds to the barycenter of said target.

9. A radar detection device comprising a digital processing module for performing the method according to claim 1.

10. A computer product comprising software code portions, which may be directly loaded into a memory of a computer, adapted to perform the steps of claim 1.

* * * * *